United States Patent
Aaron

(10) Patent No.: US 7,782,015 B1
(45) Date of Patent: Aug. 24, 2010

(54) ELECTRIC POWER SYSTEM

(76) Inventor: Billy Joe Aaron, 2007 Ave. H, Brownwood, TX (US) 76801

( * ) Notice: Subject to any disclaimer, the term of this patent is extended or adjusted under 35 U.S.C. 154(b) by 0 days.

(21) Appl. No.: 12/512,711

(22) Filed: Jul. 30, 2009

(51) Int. Cl.
*H02J 7/14* (2006.01)
*H02J 7/00* (2006.01)

(52) U.S. Cl. .......................................... 320/123; 307/66

(58) Field of Classification Search ................. 320/123; 307/66
See application file for complete search history.

(56) References Cited

U.S. PATENT DOCUMENTS

| | | | |
|---|---|---|---|
| 2,496,859 A * | 2/1950 | Dalzell ........................ | 320/124 |
| 3,616,872 A | 11/1971 | Taylor | |
| 3,816,805 A | 6/1974 | Terry | |
| 3,863,127 A | 1/1975 | Raver | |
| 3,874,551 A | 4/1975 | Harkness | |
| 4,673,826 A * | 6/1987 | Masson ........................ | 307/66 |
| 5,296,799 A | 3/1994 | Davis | |
| 5,765,656 A * | 6/1998 | Weaver ..................... | 180/65.22 |
| 6,369,463 B1 * | 4/2002 | Maiorano ..................... | 307/66 |
| 6,598,496 B2 | 7/2003 | Pannell | |
| 7,183,746 B1 * | 2/2007 | Carter ......................... | 320/123 |
| 7,292,009 B2 * | 11/2007 | Kawakami et al. ............ | 322/29 |
| 2002/0125774 A1 | 9/2002 | Molina-Martinez | |
| 2003/0168921 A1 | 9/2003 | Molina-Martinez | |
| 2007/0182274 A1 * | 8/2007 | Pardo ......................... | 310/261 |
| 2007/0182384 A1 * | 8/2007 | Shirakawa et al. ............ | 322/99 |

* cited by examiner

*Primary Examiner*—Bao Q Vu
*Assistant Examiner*—Jue Zhang
(74) *Attorney, Agent, or Firm*—Geoffrey A. Mantooth

(57) ABSTRACT

A system and method produces electrical power for a load. First and second battery banks are provided, as is an inverter bank, which produces three phase. A switch alternately connects one of the first or second battery banks to the load and to the inverter bank with the other of the first or second battery banks being disconnected from the load and the inverter bank. A motor is connected to the output of the inverter bank. The motor drives an alternator bank, which alternator bank is electrically connected to, and recharges, the other of the first or second battery banks. A timer periodically alternates the battery banks between a load mode and recharge mode.

9 Claims, 2 Drawing Sheets

ELECTRIC POWER SYSTEM

FIELD OF THE INVENTION

The present invention relates to systems and methods for producing electrical power.

BACKGROUND OF THE INVENTION

Electric power for residential, commercial and industrial use is primarily produced in thermal power generating plants. The plants burn fossil fuels such as coal or natural gas. Nuclear plants use nuclear energy to produce the necessary heat to operate the generator. Due to their large scale, generating plants require years of planning and construction and very large capital investments.

Alternative energy power generators use wind and solar energy to produce electricity. However, such generators are subject to the wind and sun and cannot produce electrical power on calm days or days with cloudy weather, or at night.

On a smaller scale, electrical generators are used as backups for hospitals, computer server facilities and the like. These backup generators kick on when the supply of electricity from the electrical supply grid is interrupted. Such generators are costly and require maintenance.

Even small electrical generators provide relatively small amounts of power (1-5 KW) and utilize gasoline or diesel engines as prime movers. These require a fuel source and require maintenance.

SUMMARY OF THE INVENTION

The present invention provides a system for producing electrical power to a load. The system comprises first and second banks of batteries. An inverter bank produces ac. A switch alternately connects one of the first or second battery banks to the load and to the inverter bank with the other of the first and second battery banks being disconnected from the load and the inverter bank. A motor is connected to the inverter bank. An alternator bank is powered by the motor. The alternator bank has an electrical output that is connected to the other of the first and second battery banks.

In accordance with one aspect of the present invention, a timer is connected to the switch. The timer periodically switches the switch.

In accordance with still another aspect of the present invention, a connector connects the inverter bank to an exterior electrical power supply to allow the first and second banks of batteries to be recharged.

In accordance with still another aspect of the present invention, a motor controller is connected between the inverter bank and the motor. The motor controller regulates the speed of the motor.

In accordance with still another aspect of the present invention, the inverter bank produces three phase ac and the motor is a three phase motor.

In accordance with still another aspect of the present invention, the alternator bank electrical output is connected to the one of the first and second battery banks.

In accordance with still another aspect of the present invention, the motor is a first motor and the alternator bank is a first alternator bank. A second motor and a second alternator bank are provided. The second motor is connected to the inverter bank. The second alternator bank is powered by the second motor and has an electrical output. The second alternator bank is connected to the one of the first and second battery banks.

The present invention also provides a method of providing electrical power to a load. First and second battery banks are provided. One of the first or second battery banks is connected to the load, with the other of the first or second battery banks being unconnected to the load. The load comprises an inverter bank. The inverter bank produces ac. A motor is driven by the ac. The motor drives at least one alternator so as to produce electricity. The alternator is connected to the other of the first or second battery banks so as to recharge the other of the first or second battery banks.

In accordance with another aspect of the present invention, the step of producing ac from the inverter bank further comprises the step of producing three phase and the step of driving a motor further comprises the step of driving a three phase motor.

DESCRIPTION OF THE PREFERRED EMBODIMENT

Figure 1:
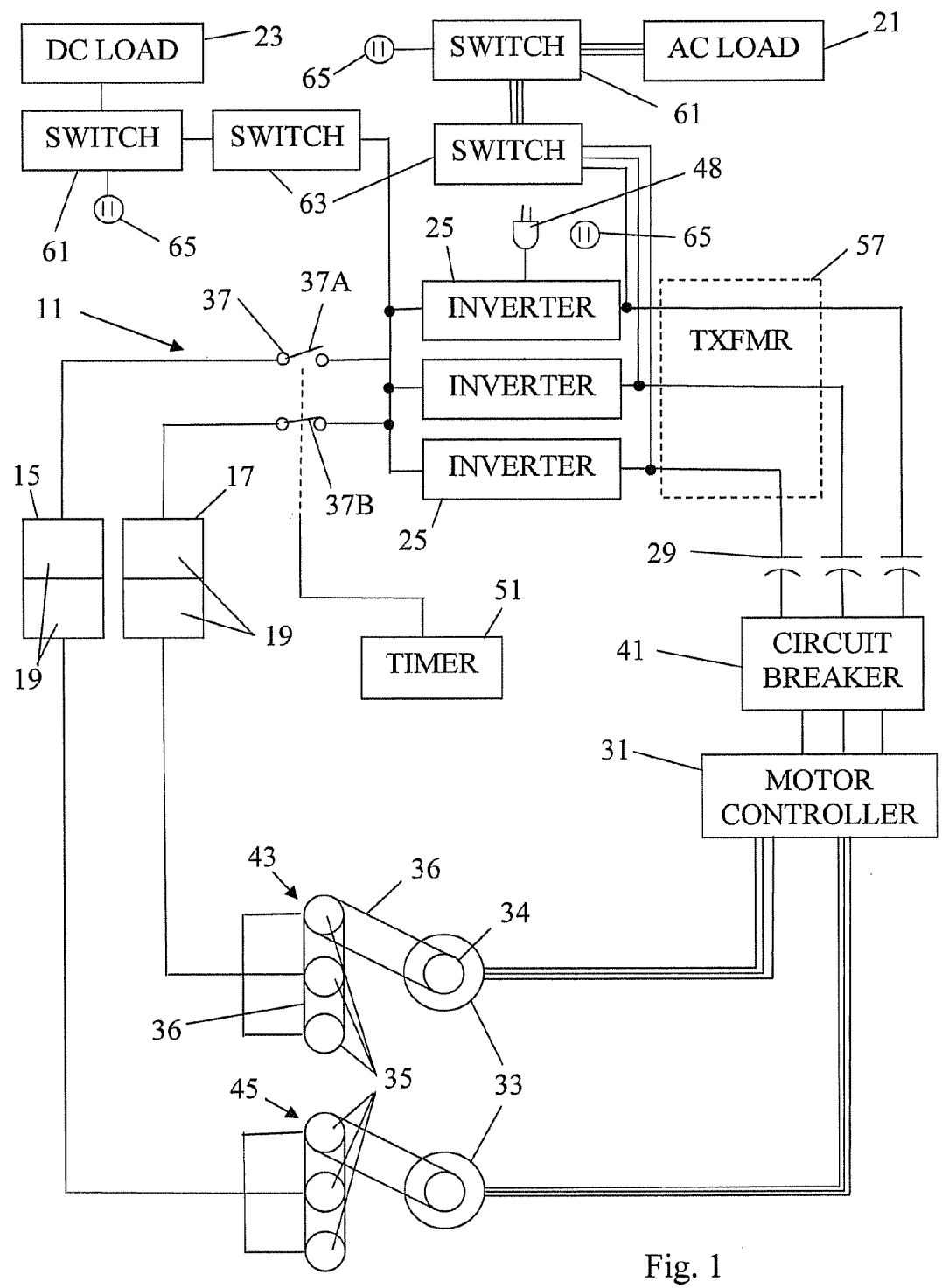
FIG. 1 is a schematic diagram showing the system of the present invention, in accordance with a preferred embodiment.

In FIG. 1, there is shown the system 11 of the present invention, in accordance with a preferred embodiment. The system utilizes plural banks 15, 17 of storage batteries 19. One bank powers an electrical load 21, 23 while the other bank is taken offline and recharged. The battery banks 15, 17 are alternated between being connected to a load 21, 23 and being recharged. The system provides and produces electricity for extended periods of time. From time to time, the system is taken offline from the load 21, 23 and allowed to recharge the banks of batteries 19 using an external power source.

The system 11 has first and second battery banks 15, 17, inverters 25, capacitors 29, a variable voltage transformer 31, motors 33 and alternators 35. A switch 37 is used to connect and disconnect each battery bank 15, 17 from the load 21, 23.

The battery banks 15, 17 are each operated in a load mode, wherein the respective battery bank provides electrical power to an electrical load 21, 23, and in a recharge mode, wherein the respective battery bank is recharged. FIG. 1 shows the system 11 configured where battery bank 17 is connected to the load 21, 23 by the switch 37 and is thus in the load mode, while the battery bank 15 is disconnected from the load and is thus in the recharge mode.

Each bank 15, 17 of batteries 19 has plural batteries. In the preferred embodiment, each battery bank has two batteries, although additional batteries can be used in a bank. In some embodiments, a single battery can be used in a battery bank. Each battery 19 is a 12 volt battery. As such, each battery is comprised of plural cells connected together. In the preferred embodiment, the batteries are heavy duty 245 A-hr lead-acid batteries, and are of the type that are commonly used for backup power supplies and wind generators. The batteries can be of the type with cloth between plates. In commercial batteries, the cloth prevents the plates from breaking under vibration.

The batteries 19 are connected into banks. In the preferred embodiment, there is a first battery bank 15 and a second battery bank 17. Each bank has two or more batteries connected in series. If the number of batteries exceeds the voltage requirements, then the batteries can be connected in parallel as necessary. There can be more than two banks of batteries. For example, there can be three or four battery banks. If there are four battery banks, then the banks can be used together or individually. For example, the first and second battery banks can be used together in both the load mode and in the recharge mode, while the third and fourth battery banks can be used together in both the load mode and the recharge mode.

The switch 37 is made up of plural switches 37A, 37B, one switch for each battery bank. The positive terminal of each battery bank is connected to a respective one of the switches 37A, 37B. The respective switch 37A, 37B connects the respective battery bank to the electrical load 21, 23 and the inverters 25, when the respective switch is closed. When the respective switch is open, the respective battery bank is unconnected from the load and the inverter bank 25.

The inverters 25 convert the dc from the battery bank to ac for use by the motors 33. For example, each inverter converts 12 Vdc to 110Vac. The inverters, which are conventional and commercially available, are rated for 5000 W continuous duty and a surge up to 10 KW. The inverters are rated at 20 A and have an efficiency of 91%. There are three inverters. The positive terminal of each battery bank is connected to the input of each inverter. The output of all of the inverters 25 taken together is three phase ac.

The output of each inverter 25 is connected to one or more capacitors 29. The capacitors serve to filter the ac waveform. The capacitors are high current capable and can therefore adapt to a heavy load. Each inverter output may have plural capacitors connected in series.

The motor controller 31 is a three phase controller connected to the motors 33. Circuit breakers 41 are connected in between the capacitors 29 and the input of the controller 31. In the preferred embodiment, the controller 31 is a variac, which is a type of variable voltage transformer. The controller has a dial that allows for manual adjustment of the voltage being provided to the motors.

The output of the motor controller 31 is three phase and is connected to the motors 33. Each motor 33 is three phase. In the preferred embodiment, each motor is three horsepower, continuous duty, 12A full load. The motor controller 31 provides to each motor 31 three lines or legs, each of which has 110 Vac.

The output of each motor 33 is connected, by way of sheaves 34 and belts 36, to an alternator bank 43, 45. In the preferred embodiment, each bank 43, 45 of alternators 35 has three alternators. Each alternator produces 2500 W full load and can operate at 2200 rpm. At 1700 rpm, each alternator produces 15V. Each alternator has a full bridge rectifier so as to produce dc. In addition, each alternator has a voltage regulator to regulate the alternator output to the batteries 19. In order to boost the efficiency of the alternators, the alternators are water cooled. A pump and radiator are provided to circulate fluid, such as water, through the heat exchange system and the alternators. The water pump is operated as part of the load 21, 23.

In addition, a fuse may be provided inline with the output of each alternator.

Figure 2:
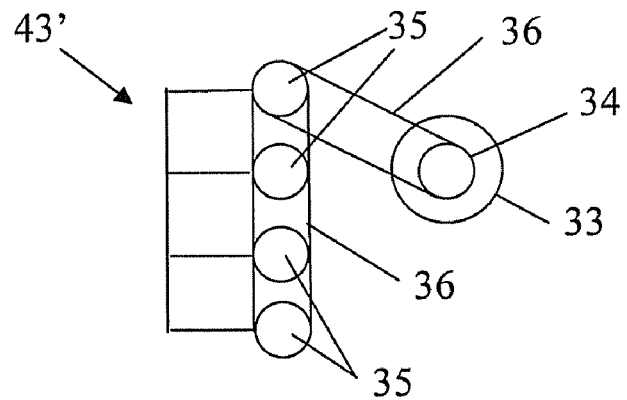
FIG. 2 shows an alternator bank in accordance with another embodiment.

I have also used four alternators in an alternator bank (see FIG. 2) and found this works well.

The output of each alternator bank 43, 45 is connected to a respective battery bank 15, 17. The positive output of each alternator bank is connected to the positive terminal of the battery bank. Thus, each battery bank 15, 17 has a motor 33 and an alternator bank 43, 45.

Figure 3:
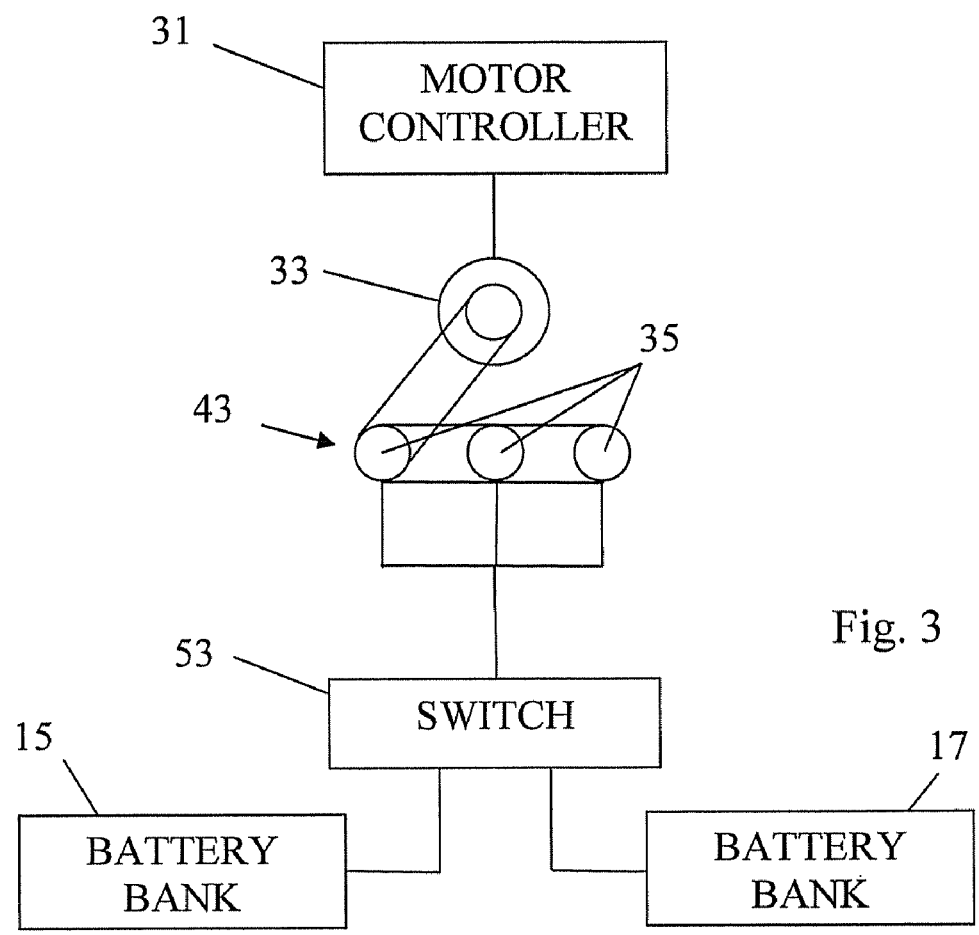
FIG. 3 shows the motor and alternator bank in accordance with another embodiment.

As an alternative, a single motor 33 and a single alternator bank 43 can be provided for all of the battery banks 15, 17, as shown in FIG. 3, with a switch 53 controlling which battery bank the alternator bank 43 is connected to.

The switch 37 is controlled by a timer 51. The timer 51 is conventional and commercially available. The timer operates the switch 37 to connect one battery bank while disconnecting the other battery bank from the inverters 25 and the load 21, 23. The timer 51 also automatically shuts the system 11 off and allows the batteries 19 to be recharged from another source, such as an electric socket or wall outlet (110 Vac).

The system 11 can be mounted onto a cart or other support structure. One or more blowers may be provided to keep the temperature of the system and its various components from rising to damaging levels. The blower is operated as part of the load 21, 23.

The system 11 is used to power one or more electric loads 21, 23. For the description herein, there is a load 21 that uses ac and a load 23 that uses dc. The load 21, 23 can be any item(s) or object(s) that uses electrical power. For example, the load 21 can be household electrical appliances such as refrigerators, lights, cooking appliances, etc. Because the batteries provide dc, if need be, the inverters 25 can be used to convert the dc into ac for the load 21. The inverters 25 provide three-phase power to the ac load. The ac load 21 can utilize one, two or three of the phases. The ac load 21 could be the electric grid 65, wherein power is provided to the grid.

Alternatively, the load can be a dc load 23. The dc load 23 can tap directly from the battery banks and need not use an inverter.

Two switches 61, 63 are provided inline with each load 21, 23. The switches 61 are current sensing switches, and are plugged into the electrical distribution network 65 or grid provided by the utility company or organization. Normally the loads 21, 23 are connected to and powered by the grid 65. The dc load 23 uses a rectifier (not shown) to convert ac from the grid 65 to dc. When electrical power from the grid is interrupted, the switches 61 sense the interruption and disconnect the loads 21, 23 from the grid 65, while connecting the loads to the system 11. Thus, the system serves as a backup power supply.

In addition to the switches 61, switches 63 are provided to connect and disconnect the system from the loads 21, 23. Switches 63 are also current sensing. The switches 63 open when current from the system 11 drops. This occurs when the timer 51 opens the switches 37A, 37B to disconnect the battery banks 15, 17, and stop the motors 33. This can be done before the batteries are recharged by the grid 65.

Circuit breakers or other circuit protection devices can be provided inline with the loads 21, 23.

The inverters 25 each have a 20 amp charger. One or more of the chargers is used to charge the battery banks. Consequently, one of the inverters 25 has an electric plug 48 for plugging into an electric outlet that provides 120 Vac. The electric outlet is connected to an external power source such as the electric utility grid.

To begin operation, the system 11 has all of its batteries 19 charged to a full charge. The inverter bank 25 is plugged 48 into an electric outlet, which provides electric power to recharge the batteries (the switches 37A, 37B are closed). The motors are not operated as dc flows from the inverters to the batteries. The load 21, 23 is disconnected from the system 11 during charging.

To begin operation, the switches 61, 63 are closed and one battery bank 17 (referring to FIG. 1) is connected to the load 21, 23 by way of the switch 37B, while the other battery bank 15 is unconnected to any load. The one battery bank 17 connected to the load provides electrical power to operate the load.

The one battery bank 17 is also connected to the charging equipment 31, 33, 43, 45 to recharge the other battery bank 15. During initial operation, the other battery bank 15 will already be charged since is has not yet been used to drive the load. In this circumstance, the battery bank 15 draws very little power from the respective alternator bank 45. However, later in the operation of the system, after the battery banks have supplied electrical power to the load, then the respective battery bank will be drawn down and need to be recharged. For example, a motor 33 drives the alternators in alternator bank 45, which alternators produce electrical power that recharges the batteries in battery bank 15, which battery bank 15 is in the recharge mode. When the other battery bank 17 is in the recharge mode, its batteries are recharged by the alternators in the alternator bank 43.

During recharge of the battery banks, the inverters 25 take the electrical dc power from the one battery bank 17 that is supplying the load 21, 23 and convert it into ac. In the preferred embodiment, the inverters 25 produce 110 Vac. There are three inverters, each of which produces one leg of ac power. Together, the inverters produce three phase ac. The inverters 25 need not be tied together or synchronized together to provide a phase shift between the three legs. I have found that the three phase motors 33 operate well by the three inverters without the need to synchronize the outputs of the inverters. The outputs of the inverters 25 are provided to the capacitors 29 which filter the waveforms. The output of each capacitor is connected, by way of the circuit breaker 41, to an input of the motor controller 31. The motor controller 31 regulates the voltage to the motors 33. A higher voltage causes the motors 33 to run faster, while a lower voltage slows the motors. Each motor 33 rotates the alternators 35 in an alternator bank 43, 45, which alternator bank produces dc electricity. The faster a motor rotates, the more electrical power its alternator bank produces. Likewise, the slower the motor rotates, the less electrical power its alternator bank produces.

In the preferred embodiment, the motor controller 31 motor speed setting is manually adjusted. Once adjusted, the motor controller setting need not be readjusted. The motor controller speed can be adjusted during the recharging process either manually or by providing a motorized controller.

The output of the alternator banks 43, 45 is connected to the respective battery bank 15, 17. Thus, the idle battery bank 15 is recharged by one of the alternator banks 45. In addition, the battery bank 17 in the load mode is also recharged to some extent by the other of the alternator banks 43. The load 21, 23 will draw more power from the load mode battery bank than is provided to the load mode battery bank by the respective alternator bank, thereby requiring the battery banks to alternate between the load mode and the recharge mode.

The timer 51 alternates the battery banks between the load mode, wherein the respective battery bank provides power to the load, and the recharge mode, wherein the respective battery bank is idle for recharging. The timer 51 changes after a predetermined period of time, causing the switch 37 to switch the idle battery bank from the recharge mode to the load mode and switch the load battery bank from the load mode to the recharge mode. In the recharge mode, the respective battery bank is disconnected from the load and the charging equipment, while in the load mode, the respective battery bank is connected to the load and the charging equipment. In the preferred embodiment, the switch time is 15 minutes; after 15 minute intervals, the timer causes the switch 37 to switch. The switching can be adjusted according to various factors such as the number of batteries in the battery banks, the electrical requirements of the load, etc. If the number of batteries in the battery bank is increased, then the switching interval can be increased. Likewise, the motor speed can be reduced. If the load is small in terms of electrical power requirements, then the switching intervals can be increased and the motor speed can be reduced.

After the system 11 has operated for some period of time, and each battery bank has operated a number of times in both the load and the recharge modes, the battery banks 15, 17 are all disconnected from the load 21, 23 by the switches 63, the motors 33 stop turning and the batteries 19 are recharged using the plug 48 and the inverters 25. This is accomplished as described above, by providing ac power to the one or more inverters 25. In the preferred embodiment, the system operates 40 to 50 hours providing power to the electrical load 21, 23; at the end of which time, the batteries are recharged for several hours. The size of the load 21, 23 is a factor in how long the system 11 can operate between downtimes. After recharging, the system 11 is put back into operation.

The use of three phase motors 33 is particularly advantageous because these motors are more efficient than single phase motors. In fact, overall, the system is highly efficient in order to minimize losses. The inverters are rated at 91% efficiency.

In the preferred embodiment, two banks 43, 45 of alternators 35 are provided. During operation, both motors 33 operate, as do both alternator banks. This allows the batteries in the recharge mode to be recharged fairly quickly. Although the system has been described with two motors 33 and two alternator banks 43, 45, a single motor and single alternator bank 43 can be used as shown in FIG. 3. In this embodiment, only one battery bank is recharged at a time, which battery bank is not in the load mode, or connected to the load 21, 23. The motor 33 and alternator bank 43 are sized so as to provide sufficient power to recharge the batteries within the desired time.

In another embodiment, the motor or motors 33 may be single phase. In this embodiment, the motors are 220V. One or more transformers 57 (shown in dashed lines) is connected to the output of the inverter bank 25 in order to boost the voltage from 110V to 220V. The inverter bank may have one or more inverters being used. The transformer 57 is 5 KW. The transformers stabilize the electrical power from the inverters. The transformers also reduce noise. The output of the transformer is a pure sign wave, which is cleaner than a modified or clipped wave.

The foregoing disclosure and showings made in the drawings are merely illustrative of the principles of this invention and are not to be interpreted in a limiting sense.

The invention claimed is:

1. A system for producing electrical power to a load, comprising:
   a) a first bank of batteries;
   b) a second bank of batteries;
   c) an inverter bank for producing ac;
   d) a switch that alternately connects one of the first or second battery banks to the load and to the inverter bank with the other of the first and second battery banks being disconnected from the load and the inverter bank;
   e) a motor connected to the inverter bank;
   f) an alternator bank powered by the motor, the alternator bank having an electrical output that is connected to the other of the first and second battery banks;
   g) a timer connected to the switch, the timer periodically switching the switch;

h) a motor controller connected between the inverter bank and the motor, the motor controller regulating the speed of the motor;

i) the inverter bank produces three phase ac, the motor is a three phase motor.

2. The system of claim 1 further comprises a timer connected to the switch, the timer periodically switching the switch.

3. The system of claim 2 further comprising a connector that connects the inverter bank to an exterior electrical power supply to allow the recharging of the first and second banks of batteries.

4. The system of claim 1 further comprising a motor controller connected between the inverter bank and the motor, the motor controller regulating the speed of the motor.

5. The system of claim 1 wherein the inverter bank produces three phase ac and the motor is a three phase motor.

6. The system of claim 1 wherein the alternator bank electrical output is connected to the one of the first and second battery banks.

7. The system of claim 1 wherein the motor is a first motor and the alternator bank is a first alternator bank, further comprising:

a) a second motor and a second alternator bank, the second motor connected to the inverter bank, the second alternator bank powered by the second motor and having an electrical output;

b) the second alternator bank is connected to the one of the first and second battery banks.

8. A method of providing electrical power to a load, comprising the steps of:

a) providing first and second battery banks;

b) connecting one of the first or second battery banks to the load, with the other of the first or second battery banks being unconnected to the load, the load comprising an inverter bank;

c) producing three phase ac from the inverter bank;

d) driving a three phase motor with the ac;

e) regulating a speed of the motor with a motor controller;

f) driving at least one alternator with the motor to produce electricity;

g) using the alternator to recharge the other of the first or second battery banks;

h) using a timer to switch connecting and unconnecting the first and second battery banks to the load and the alternator.

9. The method of claim 8, wherein:

a) the step of producing ac from the inverter bank further comprises the step of producing three phase;

b) the step of driving a motor further comprises the step of driving a three phase motor.

* * * * *